No. 691,592. Patented Jan. 21, 1902.
F. A. BROWNELL.
PHOTOGRAPHIC CAMERA.
(Application filed Aug. 24, 1899.)
(No Model.) 3 Sheets—Sheet 1.
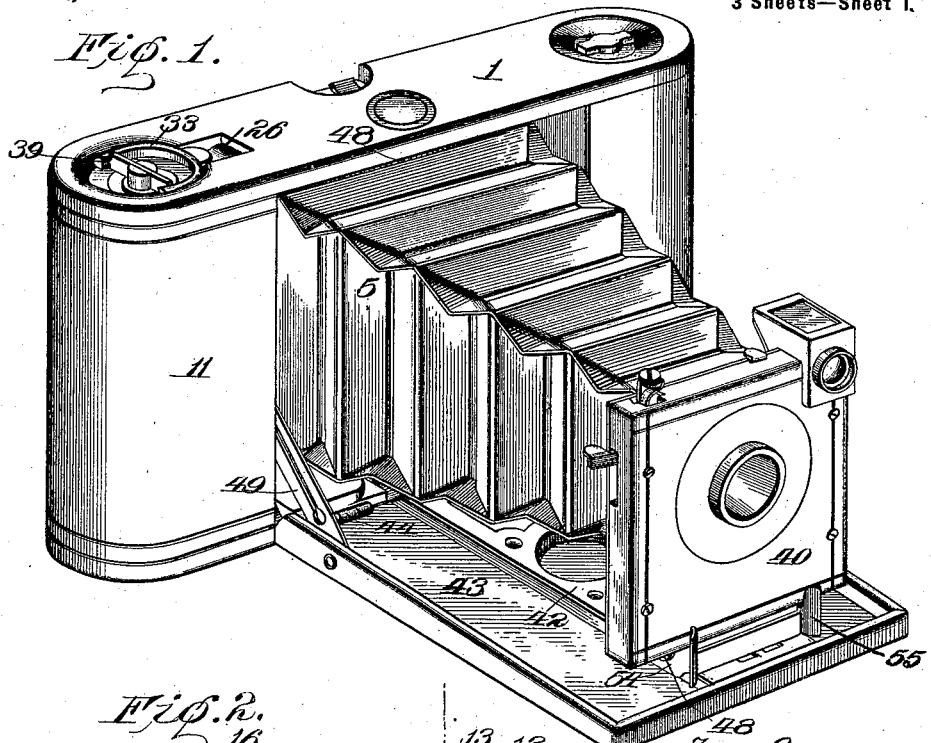
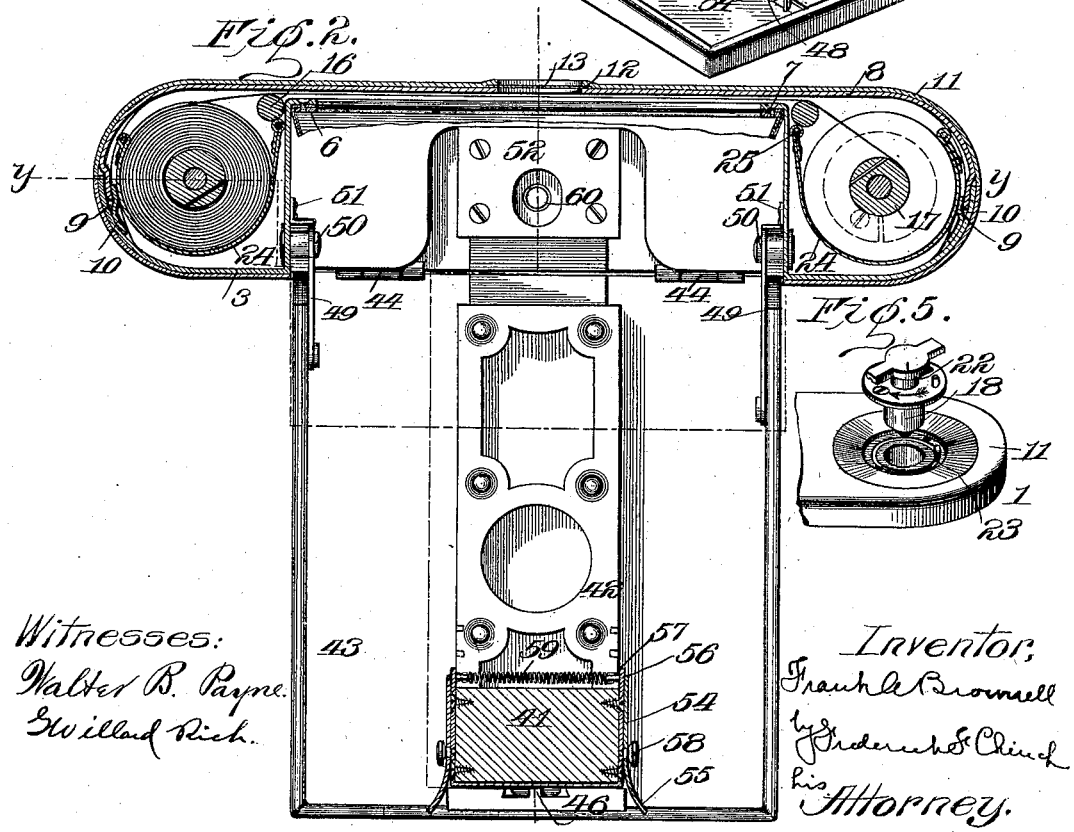
Witnesses:
Walter R. Payne.
Willard Rich.
Inventor:
Frank A. Brownell
by Frederick S. Clinch
his Attorney.

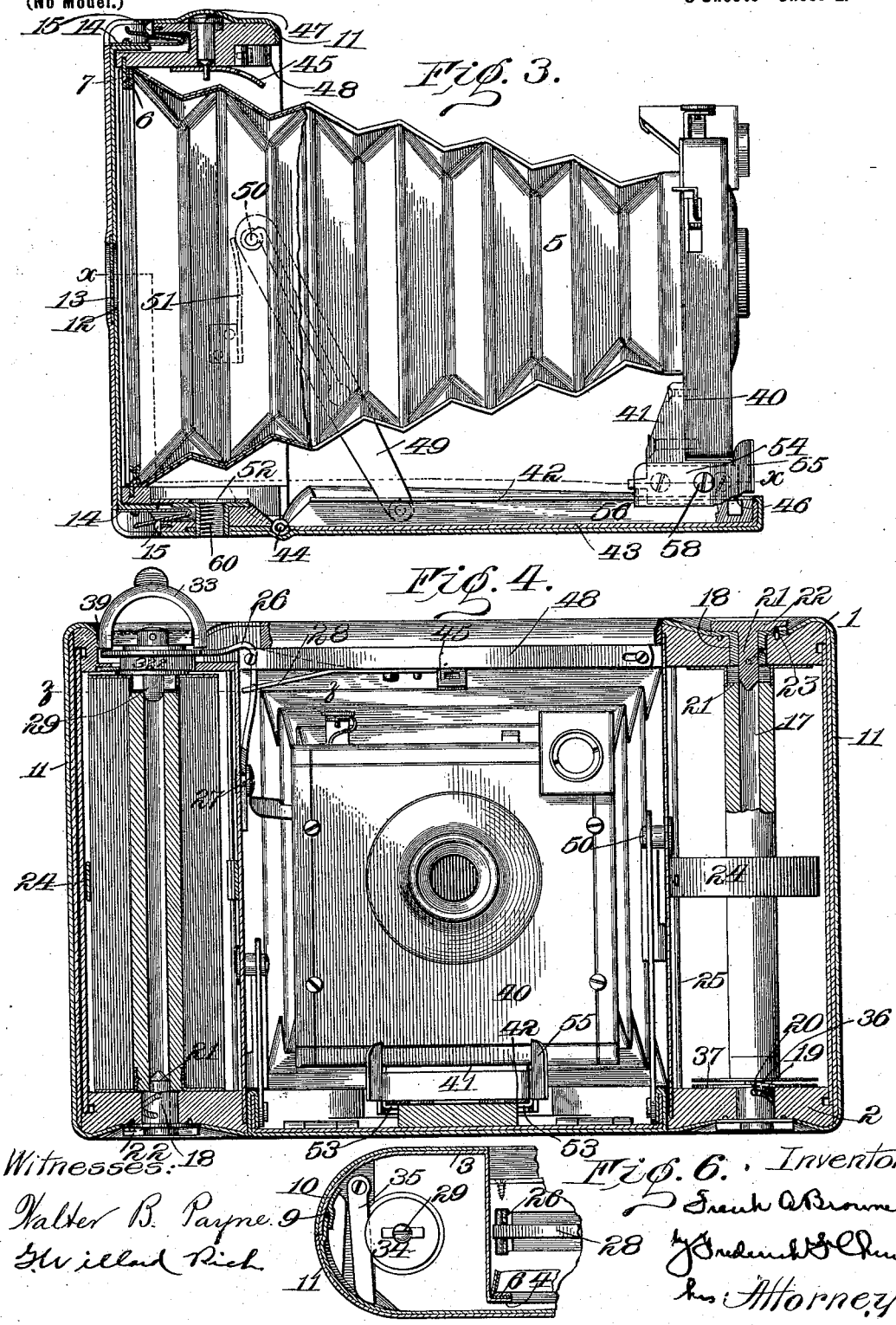

No. 691,592. Patented Jan. 21, 1902.
F. A. BROWNELL.
PHOTOGRAPHIC CAMERA.
(Application filed Aug. 24, 1899.)
(No Model.) 3 Sheets—Sheet 3.
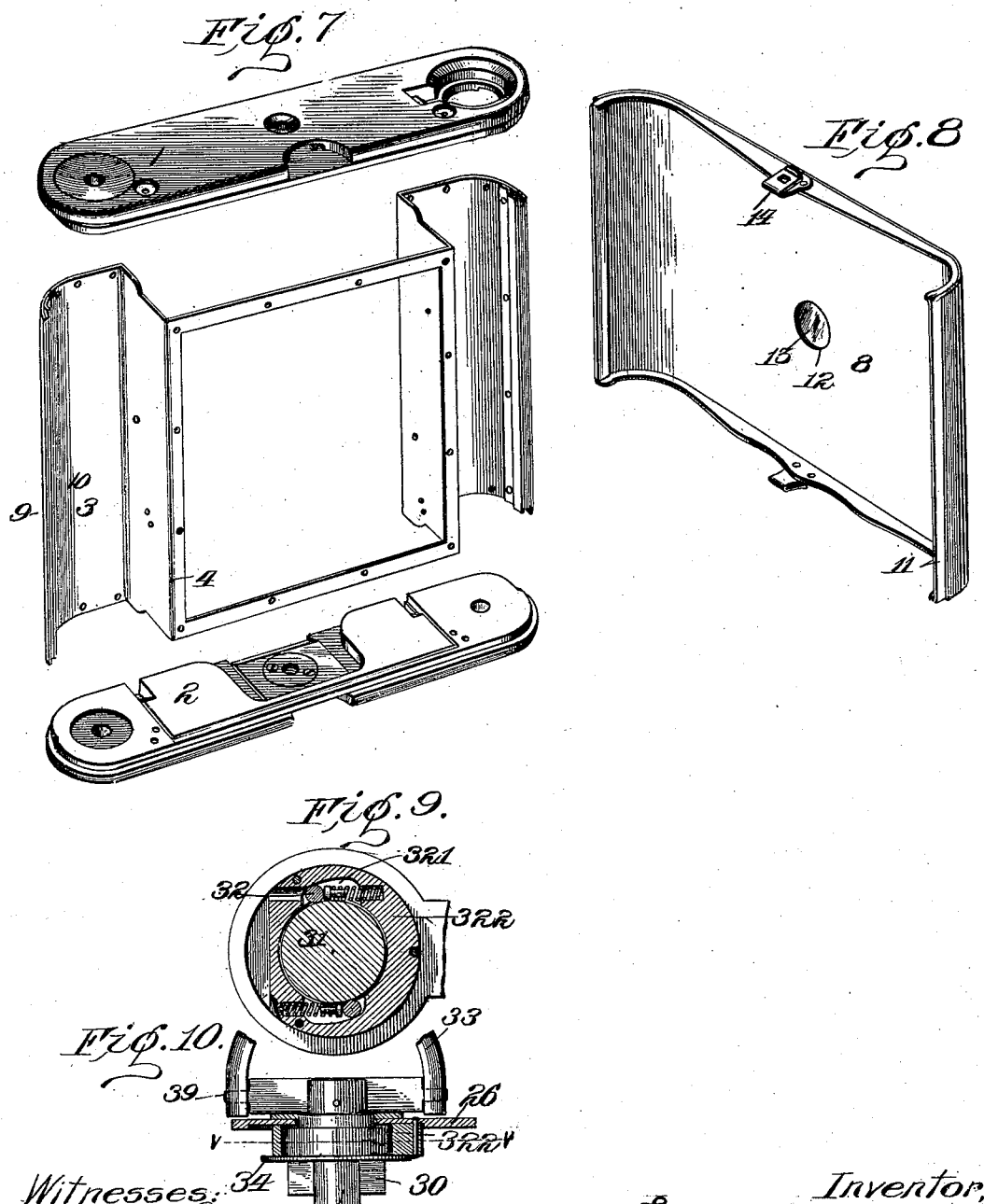

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

PHOTOGRAPHIC CAMERA.

SPECIFICATION forming part of Letters Patent No. 691,592, dated January 21, 1902.

Application filed August 24, 1899. Serial No. 728,275. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photographic cameras, particularly of that type adapted to carry film-cartridges composed of flexible film wound with black paper upon spools, which cameras are capable of being folded for carrying in the pocket or extended, so as to employ a relatively long focus-lens; and the invention consists in certain improvements and combinations of parts looking toward the simplification and facility of construction, all as will be hereinafter fully described, and the novel features pointed out in the claims at the end of this specification.

In the drawings, Figure 1 is a perspective view of a camera constructed in accordance with my invention, with the camera-front extended for use; Fig. 2, a horizontal sectional view taken on the line $x\ x$ of Fig. 3; Fig. 3, a vertical sectional view of the rear portion of the camera, showing the front in elevation; Fig. 4, a vertical sectional view taken on the line $y\ y$ of Fig. 2, with the movable front or lens-carrying frame folded within the casing;
Fig. 5, a detail perspective view showing one of the devices for holding and centering the film-spools in position; Fig. 6, a sectional view on the line $z\ z$ of Fig. 4; Fig. 7, a perspective view of the parts of the main casing separated; Fig. 8, a similar view of the rear cover-plate; Fig. 9, a sectional view on the line $v\ v$ of Fig. 10; Fig. 10, a vertical sectional view showing the spool-winding key.

Similar reference-numerals indicate similar parts.

The main frame or casing of the camera embodies the top and bottom boards or plates 1 and 2, preferably, though not necessarily, of wood, at the ends of which are provided film or spool chambers composed in part of a sheet-metal plate 3, extending between the boards 1 and 2 and bent to form the inner side walls of the spool-chambers and extending toward the rear and having an exposing-aperture of the size of the picture to be taken, the flanges or edges 4 around this aperture serving for the attachment of the rear end of the bellows 5, which is secured thereto by means of the frame or plate 6 and screws 7, as shown particularly in Fig. 2. The rear side of the main casing is formed by a cover-plate 8, fitting closely against the back, the upper and lower edges fitting into recesses formed in the ends 1 and 2, and having its ends rounded and bent inwardly, as shown in Fig. 2, to fit within recesses 9, formed by securing the small plates 10 to the edge of the casing-plate 3, this construction forming a light-tight joint and preventing the entrance of light to the film-chambers or to the passage between the same. The main casing and also the outer portion of the rear cover-plate 8 are covered with a suitable covering, such as leather, (indicated by 11,) and at or near the center of said cover-plate is an aperture 12, provided with a window 13 of red glass or celluloid, which will permit the indications or marks on the back of the black paper covering the film to be observed without opening the camera and without fogging the film. This cover-plate is secured in position by suitable spring-catches, composed in the present instance of bent spring-plates 14, secured to the upper and lower portions of the cover-plate and having apertures adapted to engage with projections in the form of screw-heads 15, as shown in Fig. 3. When it is desired to remove the cover-plate, it is only necessary for the operator to grasp with the thumb and finger the spring-catches, disengage them from the projections 15, and withdraw the cover, permitting access to both of the spool-chambers and the passage between them at the rear of the bellows. At the rear edges of the film-chambers are arranged film-supports in the form of small rollers 16, (see Fig. 2,) over which the film extends and is drawn, serving to lessen the friction. The spool contained in one of the film-chambers—say that at the right of Fig. 2 and indicated by 17—I term the "supply-spool" and containing unexposed film, and at opposite ends of said chamber are provided spool-centering devices, embodying in the present construction thimbles or sleeves 18, secured to the top and bottom boards 1 and 2 and having cam-slots 19 therein, with which coöperate pins 20, projecting laterally from a rotatable and longitudinally-movable stud or projection 21, having the head or member 22 at the outer end, so that when said studs are turned by the head the cam-slot and pin will coöperate and cause the inward and outward movements of the studs, thereby properly centering the spool, as will be understood. In order to retain the studs and prevent their accidental movement, I employ frictional holding devices and in the present instance arrange beneath the heads of the sleeves 18 small pieces of spring-wire having the end 23 extending up through an aperture in the head and adapted to engage a small depression or recess formed in the under side of the head 22 of the stud, so that while the studs may be rotated by the application of a little force they will be prevented from accidental movement. At the lower end of this supply-spool chamber is a plate 37, having an upwardly-extending spring-finger 36, adapted to engage the head of the spool and offer slight resistance to its rotation, just sufficient to keep the film reasonably taut. In order to lift the film-spools out of the spool-chambers when the cover-plate is removed, I provide in each of them a flexible band or strip 24, connected to a pin 25 at the rear of the chamber, the free end of said band extending in position to be readily grasped by the operator when the cover is removed to lift the spool after the studs 21 have been disengaged therefrom.

At the lower end of the winding-spool chamber, at the opposite side of the camera, I arrange a spool-centering device similar in all respects to the ones in the supply-chamber; but at the upper or opposite end of said chamber I provide a movable abutment or head carrying the winding device or key and capable of being detached from the spool when it is desired to remove the same from the camera. In the present embodiment this movable abutment is formed of a metal plate 26, extending down alongside the casing 3 and guided to move vertically thereon by means of a headed pin or rivet 27, the shank of which passes through a slot formed in the lower end of the plate 26, this plate being normally moved downward or toward the center of the chamber by means of a spring 28, secured to the under side of the plate or door 1, as shown particularly in Fig. 4. The upper end of the plate 26 extends across the end of the winding-spool chamber, and journaled in it is the centering stud or arbor 29, provided with an irregularly-shaped head 30, adapted to engage with a correspondingly-shaped aperture, such as a cross-slot, formed in the end of the spool. Secured to the stud 29 is a disk or wheel 31, with the periphery of which coöperate spring-operated rollers 32, moving in tapering slots 321 in a plate 322, mounted on the plate or member 26 and preventing backward rotation of the spool, and pivoted at 39 upon the upper end of said stud is a handle or bail 33, serving as a means for rotating the stud and spool and capable of being folded on its pivot down to the position shown in Fig. 1, substantially flush with the upper face of the camera-casing. The spring 28 normally presses the plate 26 toward the spool and holds the stud in engagement therewith, and to prevent accidental removal from the spool when the camera is closed or loaded I provide upon the stud 29 a collar or plate 34, with the outer side of which is adapted to engage a pivoted catch-arm 35, (see Fig. 6,) which must be placed in engagement with the plate before the outer cover-plate 6 can be closed and which cannot be unlocked until said cover-plate is removed, this arrangement rendering it impossible for the operator to accidentally withdraw the operating key or handle from engagement with the spool. The space or chamber between the two spool-chambers is to be occupied by the bellows when the camera is folded, the forward end of the bellows being attached to a suitable plate 40, carrying a lens and shutter of the usual or any preferred construction, said plate being secured to a movable block or carriage 41, movable upon a way-plate 42, secured to the inner face of a door or cover 43, hinged at 44 to the lower portion of the main frame, said cover being formed of sheet metal, with the edges turned inward to stiffen it, and adapted when the lens-plate and bellows are folded within the main casing to cover or close the space between the film-chamber and render the exterior of the camera practically smooth. The door or cover is secured when closed by a suitable spring-catch 45, having an aperture to engage a projection 46 on the door, said catch being capable of disconnection by means of a button 47 projecting through the top of the casing and having its upper end normally concealed by the covering material 11 thereon. In practice I make the spring-catch 45 and the spring 28 integral, as shown particularly in Fig. 4. In order that the door may be thrown open slightly when the spring-catch is released, I provide at the top of the casing a bow-spring 48, coöperating with the upper edge, which spring is normally under compression when the lid is closed, but will tend to throw it outward when the catch is disengaged. The lid is maintained in practically horizontal position and supported by the slotted links 49, pivoted at opposite sides and coöperating with pins 50 and also springs 51, operating to move the links, so that the pins shall enter the angular portions of the slots and prevent accidental disengagement. When the block or carriage 41, carrying the lens, is moved within the casing and between the film-chambers, it slides upon a way-plate 52, arranged at the bottom, which is in line with the way-plate 42, and the flanges or lugs 53 on said block or carriage engage with the lower edges of this plate, as will be understood.

The camera is particularly adapted for use in connection with a lens having a fixed focus, and therefore when the lens-support is drawn out it is to be secured in but one position, and to simplify and cheapen the construction of the parts I provide upon opposite sides of the block or support 41 catch-plates 54, having the outwardly-extending operating ends 55 and the inwardly-extending lugs or catches 56 at their inner ends adapted to engage notches 57, formed in the way-plate 42. These plates 54 are loosely mounted upon screws or studs 58, which latter hold them in place, but allow a slight outward movement of their inner ends, which are drawn together into engagement with the notches 57 in the way-plate by a single spring 59, connecting the two, as shown in Fig. 2, but permitting said ends to be separated when the outer ends are pressed together by the thumb and forefinger of the operator.

The particular construction and operation of the front adjusting and securing devices I do not claim herein nor illustrate in detail, as they form the subject-matter of Patent No. 684,348, dated October 8, 1901, on an application filed as a division of this one.

When the camera is to be used, the door is moved down and the camera-front brought forward until the catches 54 engage the notches in the way-plates. Then the exposures may be made in the usual manner by the manipulation of the shutter, and the film and enveloping paper moved from one compartment to the other through the passage formed between the back of the bellows and the cover-plate, and the number of the exposure noted through the aperture 12 in the rear cover of the casing. When not in use, the lens-board is folded within the casing, the lid 43 is closed and engaged by the catch, and the camera may then be slipped into the pocket of the user and carried without inconvenience. If desired, other notches could be made in the way-plate 41, as indicated in dotted lines, intermediate the ends, so as to enable the lens to be focused at intermediate points, as will be understood.

In the bottom of the main frame or casing is provided a screw-threaded thimble 60 for the application of the ordinary securing-screw carried upon a tripod when the camera is to be used in connection with a tripod, as will be understood.

I claim as my invention—

1. In a camera, a casing composed of the top and bottom plates, the integral metal plate bent to form the spool-chambers at the sides and extending toward the rear and having the central opening, the portion in front of the opening forming with the top and bottom plates a central chamber for the bellows, a door hinged to the bottom plate and having a way thereon, and a removable back plate forming a light-tight joint with the rear edges of the top and bottom and the bent metal plates to inclose the film-chambers and the film-passage between them, in combination with the bellows attached to the edges of the central opening in the metal plate, a lens-board and the carriage on which it is mounted movable upon the ways on the door into and out of the central chamber.

2. In a camera-casing, the combination with the top and bottom plates, the single metal plate bent to form the film-chambers at the sides extending toward the rear at the center and provided with the central opening, the sides of the film-chambers and the top and bottom plates forming a central chamber for the bellows, of a bellows connected to the edges of the central aperture in the metal plate and adapted to fold into the central chamber, and a lens-support and lens at the forward end of the bellows.

3. In a camera, the combination with the camera-casing embodying the top and bottom plates having the grooves on their rear sides, the single metal plate having the central aperture near the rear of the casing and extending forward and then rearwardly to form the spool-chambers and having the recesses at the rear edges, of the removable cover-plate provided with the flanges at the edges adapted to enter the recesses in the top and bottom plates and in the ends of the bent metal plates to form a light-tight joint, and catches for securing said cover-plate in position.

4. In a camera, the combination with the casing having the film-chambers at the ends, and a passage between them, of the removable cover-plate adapted to cover the film-chambers and passage between them, having the spring-catches on opposite sides and arranged intermediate the film-chambers engaging the casing and adapted to be grasped and disengaged and the plate removed by the thumb and finger of the operator's hand.

5. In a film-holder, and as a means for holding and centering film-spools, the combination with the sleeve having the cam-slot in its side, of the revoluble and longitudinally-movable stud for engaging the spool, having the projection engaging the cam-slot, and the head, of the friction-spring engaging the stud-head and preventing its rotation to disengage the stud from the spool.

6. In a film-holder, and as a means for holding and centering film-spools, the combination with the sleeve having the cam-slot, of the rotatable and longitudinally-movable stud having the pin engaging in the cam-slot, and the head having the recess in its under side, the friction-spring engaging the recess in the pin-head and preventing accidental movement to disengage the stud from the spool.

7. In a film-holder, the combination with a spool-chamber, and movable spool-centering devices therein, of a flexible band connected to the chamber at one end on one side of the spool and having a free end on the other side of the spool adapted to be grasped to move the spool laterally from the chamber, when disengaged from the centering devices.

8. In a film-holder, the combination with a film-spool chamber and a cover or closure therefor, a spool centering and rotating stud movable longitudinally into and out of engagement with a spool in the chamber, of a catch located within and inclosed by the casing for engaging and preventing longitudinal movement of the stud and capable of disengagement only when the cover is removed.

9. The combination with the casing having a film-spool chamber, and a cover therefor, of the longitudinally-movable and rotatable stud 29 having the operating-handle, and the collar 34, the movable catch 35 coöperating with the collar and adapted to be covered by the cover, when in place, thereby preventing the disengagement of the stud and spool.

10. In a camera having a spool-chamber, the combination with the plate 26 having the downwardly-extending end guided in the casing, and the spring for moving the plate, the spool-centering stud having the irregular-shaped head rotatable in the plate and having the handle, means for preventing the backward movement of the stud, of a spool-centering stud arranged at the opposite end of the spool-chamber.

11. In a photographic-roll-holding device, the combination with a spool-winding stud or arbor having the handle, the irregular head and the disk 31 thereon, of a plate 322 having the tapering slots therein, the rollers in the slots, and the springs operating upon the rollers for forcing them into the narrow portions of the slots, thereby preventing backward rotation of the winding-key.

FRANK A. BROWNELL.

Witnesses:
  F. F. CHURCH,
  ELIZABETH B. ROBY.